(12) United States Patent
Xu et al.

(10) Patent No.: US 10,306,421 B2
(45) Date of Patent: May 28, 2019

(54) WEARABLE DEVICE NOTIFICATION FRAMEWORK

(71) Applicant: Huami Inc., Mountain View, CA (US)

(72) Inventors: Yurong Xu, Mountain View, CA (US); Xiao-feng Li, Mountain View, CA (US); Jun Yang, Mountain View, CA (US)

(73) Assignee: Huami Inc., Mountain View, CA (US)

( * ) Notice: Subject to any disclaimer, the term of this patent is extended or adjusted under 35 U.S.C. 154(b) by 7 days.

(21) Appl. No.: 15/620,466

(22) Filed: Jun. 12, 2017

(65) Prior Publication Data

US 2018/0310136 A1 Oct. 25, 2018

Related U.S. Application Data

(60) Provisional application No. 62/489,654, filed on Apr. 25, 2017.

(51) Int. Cl.
| | | |
|---|---|---|
| *H04W 4/04* | (2009.01) | |
| *G08C 17/02* | (2006.01) | |
| *H04M 1/725* | (2006.01) | |
| *H04L 12/58* | (2006.01) | |
| *H04B 1/3827* | (2015.01) | |
| *G06F 17/30* | (2006.01) | |

(52) U.S. Cl.
CPC ...... *H04W 4/043* (2013.01); *G06F 17/30864* (2013.01); *G08C 17/02* (2013.01); *H04B 1/385* (2013.01); *H04L 51/20* (2013.01); *H04L 51/32* (2013.01); *H04M 1/72552* (2013.01)

(58) Field of Classification Search
CPC ......... H04W 4/043; H04W 4/02; H04W 4/30; H04W 4/029; H04L 51/20; H04L 51/32; H04B 1/385; G06F 17/30864
See application file for complete search history.

(56) References Cited

U.S. PATENT DOCUMENTS

| | | | |
|---|---|---|---|
| 7,142,979 B1 * | 11/2006 | Shonk ................... | G08G 1/127 701/446 |
| 2009/0119009 A1 * | 5/2009 | Dicke .................... | G01C 21/30 701/533 |
| 2010/0285771 A1 * | 11/2010 | Peabody .............. | G08B 25/016 455/404.2 |
| 2017/0245110 A1 * | 8/2017 | Ruiz ..................... | H04W 4/023 |
| 2017/0251347 A1 * | 8/2017 | Mehta .................... | H04W 4/90 |

* cited by examiner

*Primary Examiner* — Said M Elnoubi
(74) *Attorney, Agent, or Firm* — Young Basile Hanlon & MacFarlane, P.C.

(57) ABSTRACT

A wearable device notification framework includes devices configured to generate and transmit messages. Measurement data and location data generated based on an event can be received by a server device from a wearable device or a connected device configured to receive data from the wearable device and relay the data to the server device. The measurement data can indicate values generated using one or more sensors of the wearable device, and the location data can indicate a geolocation of the wearable device as of the event. An address-based location corresponding to the location data can then be identified by querying a map service for map data based on the location data. The address-based location can correspond to one of an on-road or off-road location of the wearable device. A message can then be generated using the measurement data and the address-based location and transmitted to a recipient device.

20 Claims, 11 Drawing Sheets

WEARABLE DEVICE NOTIFICATION FRAMEWORK

CROSS REFERENCE TO RELATED APPLICATION(S)

This disclosure claims the benefit of U.S. Provisional Application No. 62/489,654, filed Apr. 25, 2017, the disclosure of which is hereby incorporated by reference in its entirety.

TECHNICAL FIELD

This disclosure relates to a wearable device notification framework.

BACKGROUND

Wearable devices are becoming increasingly commonplace. They may be used in a variety of contexts, such as to measure vital signals, track exercise or fitness progress, view emails or social media content, or the like. In some cases, a wearable device may include functionality for communicating data to a server, such as to record information received as input from the user thereof or based on the occurrence of an event.

SUMMARY

Disclosed herein are implementations of a wearable device notification framework.

In an implementation, an apparatus is provided for generating and transmitting messages indicative of data measured using a wearable device. The system comprises a server device. The server device comprises a memory and a processor. The processor is configured to execute instructions stored in memory to receive measurement data and location data generated based on an event. The measurement data indicates values generated using one or more sensors of the wearable device. The location data indicates a geolocation of the wearable device as of the event. The processor is further configured to execute instructions stored in the memory to identify an address-based location corresponding to the location data by querying a map service for map data based on the location data. The address-based location corresponds to one of an on-road or off-road location of the wearable device. The processor is further configured to execute instructions stored in the memory to generate a message using the measurement data and the address-based location. The processor is further configured to execute instructions stored in the memory to transmit the message to a recipient device.

In an implementation, a method is provided for generating and transmitting messages indicative of data measured using a wearable device. The method comprises receiving measurement data and location data generated based on an event. The measurement data indicates values generated using one or more sensors of the wearable device. The location data indicates a geolocation of the wearable device as of the event. The method further comprises identifying an address-based location corresponding to the location data by querying a map service for map data based on the location data. The address-based location corresponds to one of an on-road or off-road location of the wearable device. The method further comprises generating a message using the measurement data and the address-based location. The method further comprises transmitting the message to a recipient device.

In an implementation, a system is provided. The system comprises a wearable device and a server device. The wearable device is configured to generate a notification based on a measurement determined using a sensor and based on a user input received using an input element. The server device is configured to generate a message based on the notification using an address identification mechanism and a message generation mechanism. The address identification mechanism is configured to query a map system for a street address corresponding to geolocation coordinates indicative of a location of the wearable device and to determine whether the geolocation coordinates reflect an on-road location or an off-road location with respect to the street address. The message generation mechanism is configured to generate the message based on the notification and the on-road location or off-road location. The server device is configured to transmit the message to a recipient device having permissions to receive the message.

These and other aspects of this disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
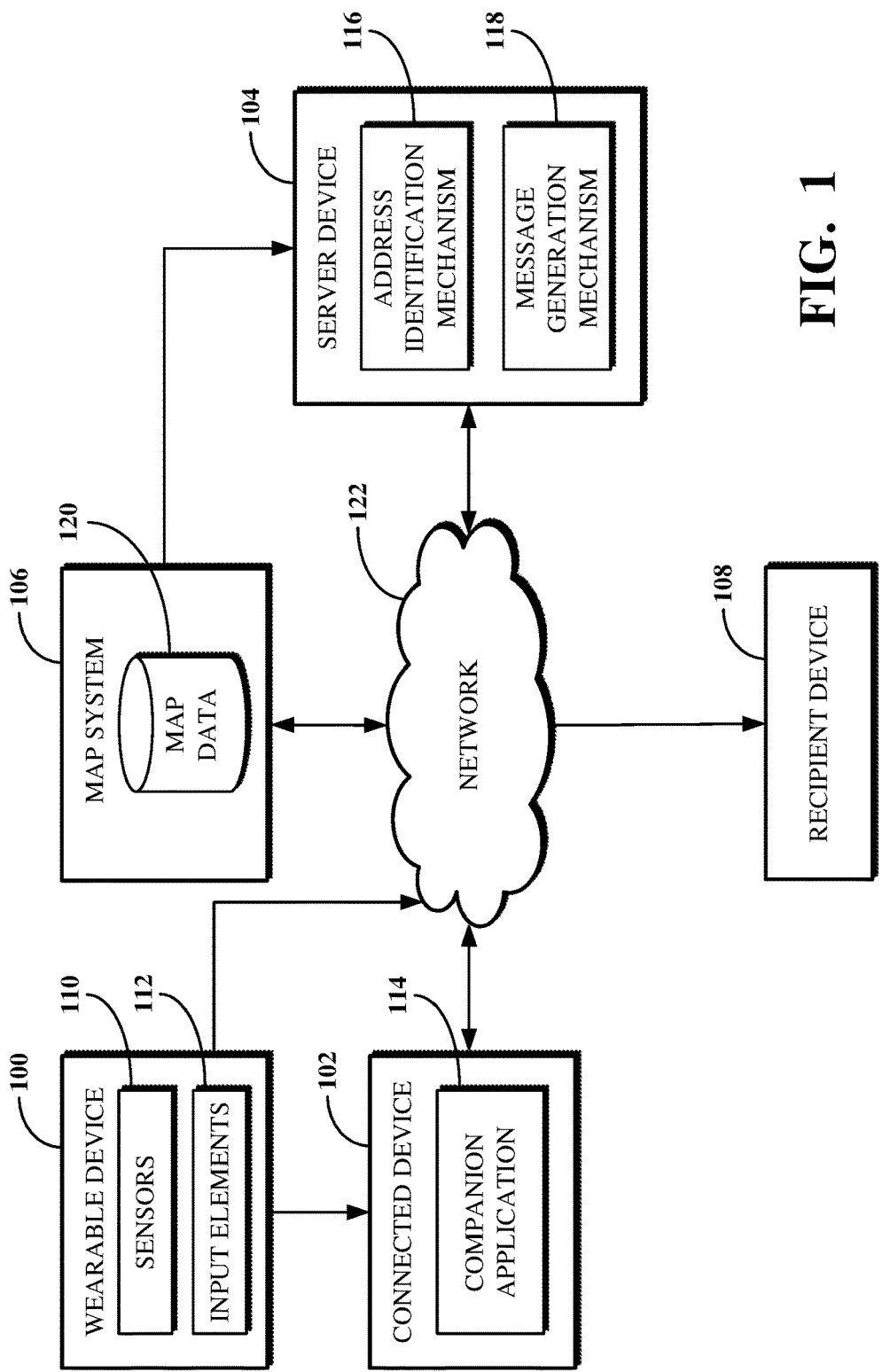
FIG. 1 is a block diagram of an example of a system for generating and transmitting messages within a wearable device notification framework.

Wearable devices are becoming increasingly popular as multi-purpose devices. Although they gained initial public interest as tools for monitoring exercise or fitness metrics, the functionality available within wearable devices has expanded to include biometric measurement, step counting, gesture detection, and more. Wearable devices are also being implemented in a variety of form factors, including wristbands, rings, and headsets. The expanded functionality and versatile implementation options as much contribute to the popularity and wide-spread use of wearable devices as they do respond to it.

One particular feature available for use with some wearable devices relates to geolocation detection. Some wearable devices may include a geolocation component, such as a geo-positioning system (GPS) location unit, for detecting geolocation information of the wearable device, such as latitude and longitude coordinates. The user of the wearable device can use the geolocation information, such as to identify his or her current location. Alternatively, the geolocation information can be used by a third party, such as an emergency service, such as to help them to locate the user of the wearable device.

However, there may be situations where the geolocation information is not useful to locate the user of the wearable device. For example, the recipient of the geolocation information may not be able to translate latitude and longitude coordinates into meaningful information for locating the user of the wearable device. That is, the recipient may rely on street addresses for location. The recipient would be unaware of how to interpret those coordinates because the geolocation information does not indicate how those coordinates relate to a street address. In another example, the recipient of the geolocation information may not be able to locate the user of the wearable device because the user has moved. The geolocation information indicates coordinates of the user of the wearable device at the time those coordinates were detected; however, it does not account for changes to the location of the user, such as where the user continues to move after the geolocation information is received by the recipient.

Implementations of this disclosure address problems such as these by using a wearable device notification framework including functionality for generating messages indicative of an address-based location of a user of a wearable device. The wearable device notification framework can include a server device, a wearable device, and application software executing on a connected device. Measurement data and location data generated based on an event can be received by the server device from one of the wearable device or the connected device. The measurement data can indicate values generated using one or more sensors of the wearable device, and the location data can indicate a geolocation of the wearable device as of the event.

An address-based location corresponding to the location data can then be identified, such as by the software executing on the server device querying a map service for map data based on the location data. The address-based location can correspond to one of an on-road or off-road location of the wearable device. For example, the address-based location can indicate a street address of a physical location or a measured distance from a street address. An on-road location can refer to a street address that matches geolocation data included in the location data. An off-road location can refer to a location that is a distance and direction away from a nearest street address corresponding to that geolocation data.

The server device can generate a message using the measurement data and the address-based location. For example, the message can indicate one or both of the event that occurred or the address-based location. Software executing on the server device can cause the message to be transmitted to a designated recipient device, which may be another wearable device, connected device, or the like.

To describe some implementations in greater detail, reference is first made to examples of hardware structures within a wearable device notification framework. FIG. 1 is a block diagram of an example of a system for generating and transmitting messages within a wearable device notification framework. The system includes a wearable device 100, a connected device 102, a server device 104, a map system 106, and a recipient device 108.

The wearable device 100 is a computing device that can be worn by a human user. For example, the wearable device 100 can be implemented as a wristband, smartwatch, arm band, leg band, brace, ring, headband, headset, glasses, another wearable component, or a combination thereof. The wearable device 100 can include a body configured to be coupled to a portion of a user. For example, the body can be a band wearable about a user's wrist, ankle, arm, or leg. The wearable device 100 can include a securing mechanism for securing the wearable device 100 to the user while in use. For example, the securing mechanism can be or include a slot and peg configuration, a snap-lock configuration, or the like.

The wearable device 100 can include one or more components for monitoring, measuring, or otherwise generating data, such as based on characteristics of a user of the wearable device 100, the environment in which the user is located, or both. For example, the wearable device 100 can include one or more sensors 110 and/or input elements 112. The sensors 110 can measure information about conditions of the wearable device 100, the user thereof, or both. The sensors 110 can be configured to measure medical, physical, or other activity. For example, the sensors 110 can include one or more of an accelerometer, a gyroscope, a photoplethysmogram (PPG), an electrocardiogram (ECG), a barometer, a magnetic sensor, or the like, or a combination thereof. The input elements 112 can receive input from the user of the wearable device 100. For example, the input elements can include one or more of a physical button, a touch screen, or the like, or a combination thereof.

The sensors 110 and/or the input elements 112 can be used to generate data based on an event that occurred with respect to the wearable device 100, the user of the wearable device 100, or both. Examples of events can include the user of the wearable device 100 falling down, entering a low-pressure environment, returning to a designated physical location (e.g., home or office), or the like. The wearable device 100 can generate data indicative of an event using measurements taken by the sensors 110 and/or based on interactions with the input elements 112. For example, data can be generated based on an accelerometer measurement from the sensors 110, a physical button of the input elements 112 being pressed, or the like.

Aspects of the sensors 110 and/or the input elements 112 can be configured to be associated with specific types of events. For example, a single physical button press may be associated with a first event (e.g., the user of the wearable device 100 arriving home), whereas multiple presses of that physical button or a configurable pattern of presses thereof may be associated with a second event (e.g., the user of the wearable device 100 falling down). In another example, gestures recognized using one or more of the sensors 110 can be associated with events. For example, a first gesture of a user of the wearable device 100 swinging his or her arm can be measured and associated with a first event, whereas a second gesture of the user waving his or her hands can be measured and associated with a second event.

In yet another example, measurements taken by the sensors 110 can be associated with events, such as by default. For example, a low reading by a barometer can be associated with the user of the wearable device 100 arriving in a low-pressure environment. In another example, accelerated heart rate readings by a PPG or an ECG can indicate that the user is experiencing a medical event requiring attention.

The connected device 102 is a computing device that can execute application software, such as a companion application 114. The connected device 102 may be a mobile device or a fixed device. For example, the connected device 102 can be a mobile device such as a smartphone, tablet computer, personal digital assistant, or other generally portable device. In another example, the connected device 102 can be a fixed device such as a desktop computer, router/gateway device (e.g., including Bluetooth® capacity, such as a Bluetooth® Low Energy (BLE) component), or other generally non-portable device. The companion application 114 is application software that links a common user account to the wearable device 100 and the connected device 102. A user of the wearable device 100 can use companion application 114 to configure functionality of the wearable device 100. For example, the companion application 114 can include functionality for associating ones of the input elements 112 of the wearable device 100 with different events that may occur with respect to the wearable device 100 and/or the user thereof. The companion application 114 can include functionality for differentiating between events that occur with respect to the wearable device 100 and/or the user thereof based on the data generated using the sensors 110 and/or the input elements 112 (e.g., based on associations between aspects thereof and the specific events).

The server device 104 is a computing device that communicates data with other computing devices. The server device 104 can be a server computer at a datacenter, such as a server installed within a rack. The server device 104 can access data stored in a database or other data store, such as to maintain records of information received from, requested by, transmitted to, or otherwise communicated with other computing devices, such as the wearable device 100, the connected device 102, or the like.

The server device 104 can include an address identification mechanism 116 and a message generation mechanism 118. The address identification mechanism 116 includes instructions executable by a processor of the server device 104 to determine an address-based location of the wearable device 100 based on location data associated with the wearable device 100 and data queried from the map system 106 (described below). The message generation mechanism 118 includes instructions executable by a processor of the server device 104 to generate a message indicative of the address-based location determined using the address identification mechanism 116. The message can also be generated based on measurement data indicative of an event associated with the wearable device 100.

The map system 106 includes hardware and software for generating map data 120. The map data 120 can include satellite map data, topographical map data, or other data, such as data associating street addresses with geolocation coordinates. For example, the map system 106 can include a server and a data source in communication with the server, such as a satellite. Data measured or otherwise obtained by the data source can be transmitted to the server for processing, such as for storage within a database, association with landmarks or other physical locations, or the like. The map system 106 can be operated by a same operator of the server device 104. Alternatively, the map system 106 can be operated by a third party. One example of a third party-operated map system is the Google® Maps service. The server device 104 may also have direct access to the map system 106. The connection between the server device 104 and the map system 106 may use one or more physical or virtual communication channels, such as in addition to an Internet, TCP/IP, or like connection. For example, one such physical communication channel may be implemented using a hardware component (e.g., a network card) installed in the server device 104. That hardware component may be distinct from other components used to facilitate network connections. For example, that hardware component may be specifically configured for communicating with the map system 106, such as using a defined port and/or connection. Such physical or virtual communication channels may improve the security of communications by or from the server device 104, such as by providing a direct connection between the map system 106 and the server device 104. This direct connection may be used, for example, to avoid interference from public Internet or like network systems.

The recipient device 108 is a computing device not operated by the user of the wearable device 100. The recipient device 108 can be a wearable device, a mobile device, or another computing device. The recipient device 108 can be designated as a recipient of messages generated based on data communicated from the wearable device 100. For example, the companion application 114 executing on the connected device 102 can include functionality for designating the recipient device 108 to receive applicable messages generated by the server device, such as based on an identifier thereof. For example, where the recipient device 108 is a mobile device, the identifier can be a telephone number or email address, such as may be included within an entry in a contact list. In another example, where the recipient device 108 is a wearable device, the companion application 114 can query records available to the server device 104 for an identifier of that wearable device, such as a proprietary identifier.

After a message is generated based on data received from the wearable device 100 (e.g., based on data generated using one or more of the sensors 110 or input elements 112), the message can be transmitted from the server device 104 to the recipient device 108. Transmitting the message to the recipient device 108 can include transmitting a text-based message to the recipient device 108, making a telephone call to a phone number associated with the recipient device 108, other types of communications, or a combination thereof, as applicable. The transmission of the message to the recipient device 108 can be configured using the server device 104, the companion application 114, or using one or more third party services, such as IFTTT.

A network 122 can be used for communications between ones of the wearable device 100, the connected device 102, the server device 104, the map system 106, and the recipient device 108. The network 122 can include one or more wired or wireless versions of Internet, intranet, Ethernet, WiFi, Bluetooth®, radio frequency, near field communication (NFC), code division multiple access (CDMA), global system for mobile communications (GSM), long-term evolution (LTE), or the like. Communications over the network 122 can be facilitated using routers, switches relays, servers, or the like for connecting ones of the wearable device 100, the connected device 102, the server device 104, the map system 106, and the recipient device 108. The network 122 can be a local area network, a wide area network, an Internet of Things (IoT) network, a machine-to-machine network, another type of network, or a combination thereof.

The wearable device 100 can communicate data with the server device 104 over the network 122. For example, the wearable device 100 can include a network interface permitting a connection to the Internet (e.g., via Wi-Fi, LTE, or the like). However, where the wearable device 100 does not include a network interface or like element for accessing the network 122, the wearable device 100 can use a network connection of a relaying device to transmit data from the wearable device 100 to the server device 104. The relaying device can, for example, be the connected device 102, a separate router/gateway, or another Internet-ready device. For example, the wearable device 100 can include a BLE component configured to transmit data to the relaying device. The relaying device can be configured to transmit (e.g., automatically or responsive to user input) data received from the wearable device 100 over BLE or like protocols to the server device 104 over the network 122. Examples of a router/gateway can include network routers, switches, voice-controlled devices (e.g., Google® Home or Amazon® Echo), IFTTT gateways, push notification service gateways, or other devices.

One example for using the system of FIG. 1 may include a situation where a user of the wearable device 100 has fallen down. The input elements 112 can receive user input indicating that the user has fallen down. For example, the user of the wearable device 100 may have previously configured an association between a particular button press pattern and the event of falling down, such as using the companion application 114 executing on the connected device 102. The user can perform the button press pattern to indicate that an event that has occurred includes the user falling down. Data indicative of the event, such as an indication of the fall and geolocation coordinates of the wearable device 100, can be transmitted from the wearable device 100 to the server device 104 via the network 122. The address identification mechanism 116 can use the transmitted geolocation coordinates and the map data 120 from the map system 106 to identify an address-based location of the wearable device 100.

For example, the data transmitted from the wearable device 100 to the server device 104 can include a name of the user of the wearable device 100, an indication of the event (e.g., that the user fell down), and latitude and longitude coordinates of the wearable device 100 at the time the button was pressed by the user. The address identification mechanism can use the latter information to query the map system 106. The query can return a street address associated with the coordinates. If the coordinates to not match a street address, a directional measurement can be made to determine how far and in which direction the user of the wearable device 100 is from the closest (or a closest) street address. For example, the address-based location can indicate that the user of the wearable device 100 is at "123 Main Street" or that he or she is "40 meters north of 123 Main Street."

The message generation mechanism can use the data indicating the event and the address-based location data to generate a message including an indication of the user having fallen down and a street address or nearby location at which the user can be located. The server device 104 can then transmit the message to the recipient device 108, which, for example, may be a connected device of a neighbor or family member of the user of the wearable device 100. For example, a user of the recipient device 108 can receive a message indicating the name of the user of the wearable device 100, the indication of the event, and the address-based location generated by the server device 104. The recipient of the message can use the message to locate the user of the wearable device 100, such as to offer medical assistance. The recipient device 108 can be identified based on a contact list maintained by a user of the wearable device 100. For example, the user of the wearable device 100 can store contacts using the companion application 114 and designate the recipient device 108 based on a stored contact.

Implementations of the system of FIG. 1 can include additional, less, or combined functionality as compared to that described above, or functionality other than that described above, or combinations thereof. In some implementations, the data transmitted from the wearable device 100 to the server device 104 (with or without the use of a relaying device) can include data other than measurement data and location data. For example, the data transmitted from the wearable device 100 can include identity information associated with the user of the wearable device 100, such as a name, age, other information, or a combination thereof. In another example, the data transmitted from the wearable device 100 can include device information associated with the wearable device 100, such as a model number, serial number, other information, or a combination thereof.

In some implementations, the server device 104 can include a single software mechanism comprising the functionality of the address identification mechanism 116 and the message generation mechanism 118. For example, the single software mechanism can receive measurement data and location data based on an event and process the measurement data upon the generation of an address-based location determined based on the location data.

In some implementations, the map system 106 can be omitted. For example, the server device 104 can communicate directly with a database that stores the map data. In another example, the map data can be stored on the server device 104. In some implementations, the companion application 114 can be omitted. For example, the functionality for configuring associations between input elements and events may be implemented using the wearable device 100 itself. In another example, the functionality may be implemented using a computing device other than the connected device 102, such as a desktop, laptop, or tablet computer or other mobile or fixed device. For example, that other computing device can be used to access an online portal at which a user may configure the associations between the input elements of the wearable device 100 and the events.

In some implementations, the map system 106 can be a plurality of map systems. For example, certain map systems may or may not be available to the server device 104 based on the location of the server device 104, the network services available to or used by the wearable device 100 or the connected device 102 (e.g., based on service providers thereof), or other circumstances. A notification received from the wearable device 100 or the connected device 102 can include data usable by the server device 104 to identify one of the plurality of map systems that can be queried to generate the address-based location for the message.

In some implementations, the server device 104 may include additional functionality. For example, the server device 104 can include functionality for locating other users of wearable devices that are close in physical proximity to the user of the wearable device 100. For example, after receiving a notification including location data from the wearable device 100 or the connected device 102, the server device 104 can query a database or other data store for recent records of wearable devices based on the location data included in the notification. The server device 104 can then transmit an indication of one or more nearby other users to the wearable device 100 or the connected device 102.

Figure 2:
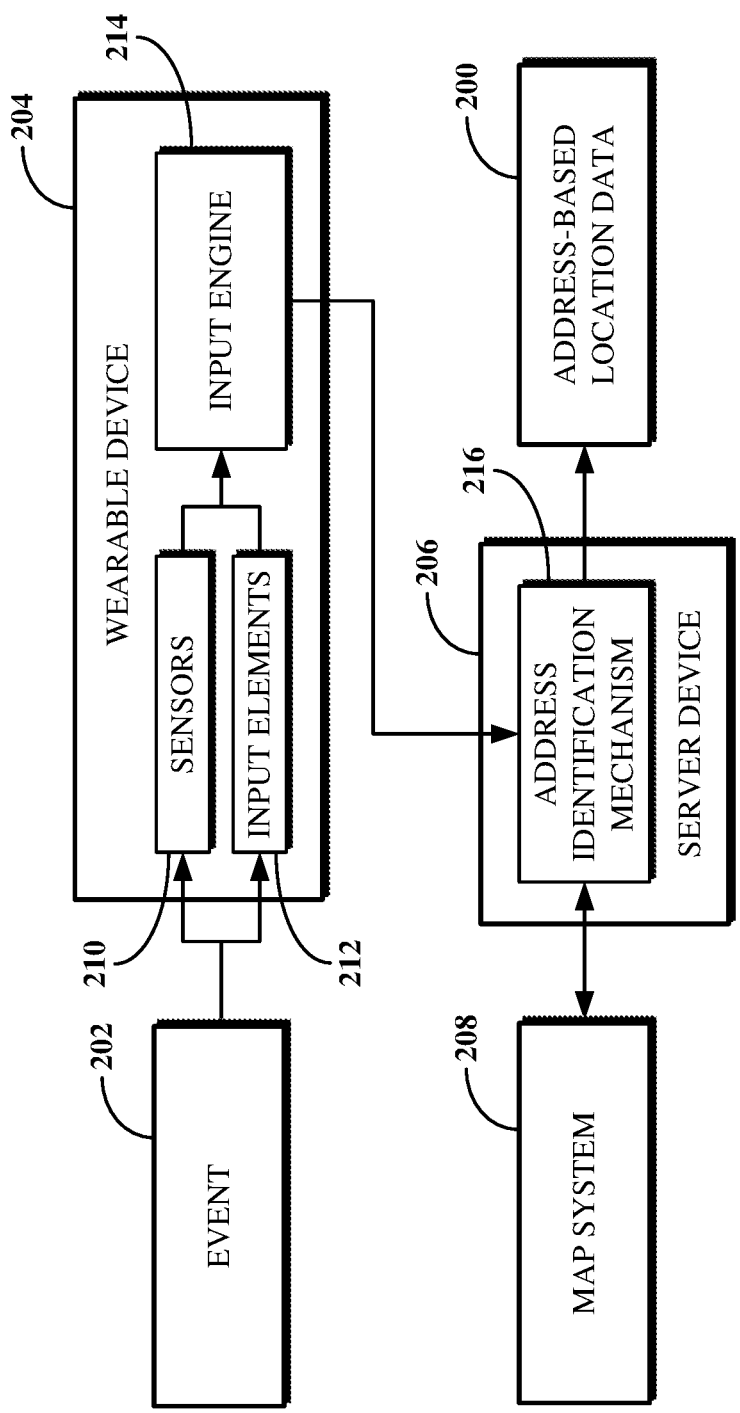
FIG. 2 is a block diagram of an example of generating address-based location data based on an event.

FIG. 2 is a block diagram of an example of generating address-based location data 200 based on an event 202. The address-based location data 200 can be an address-based location generated based on data received from or processed by a wearable device 204, a server device 206, and a map system 208. For example, the wearable device 204, the server device 206, and the map system 208 may respectively be the wearable device 100, the server device 104, and the map system 106 shown in FIG. 1. FIG. 2 shows an example of generating the address-based location data 200 where the wearable device 204 is configured to generate location data indicative of a geolocation of the wearable device 204. As such, other implementations may not be represented by the example shown in FIG. 2, such as implementations in which a connected device (e.g., the connected device 102 shown in FIG. 1) is used to generate the location data.

Upon the occurrence of the event 202, data can be generated using one or more sensors 210 and/or input elements 212 of the wearable device. The sensors 210 and input elements 212 may, for example, respectively be the sensors 110 and the input elements 112 shown in FIG. 1. For example, the sensors 210 can measure information about the user of the wearable device 204 or the environment in which the wearable device 204 is located. In another example, the input elements 212 can receive user input using one or more physical buttons, touch screens, or the like. The measurements and user input received using the sensors 210 and the input elements 212 can be associated with specific events. For example, the event 202 can be indicated by a specific gesture measured by the sensors 210, a specific button press pattern using the input elements 212, or the like.

The wearable device 204 can include an input engine 214 for generating the data to transmit to the server device 206 based on the measurements taken by the sensors 210 and/or the user input received using the input elements 212. The input engine 214 includes functionality for detecting which of the sensors 210 and/or input elements 212 were used in connection with the event 202. For example, the input engine 214 can explicitly detect ones the input elements 212 that were interacted with by a user of the wearable device 204. In another example, the input engine 214 can use pattern recognition to detect ones of the sensors 210 that were used to measure data based on the event 202. For example, the input engine 214 can generate measurement data based on the event 202 upon a determination that the measurements taken by the sensors 210 correspond to a pre-defined pattern.

The data generated using the input engine 214 can include measurement data generated using one or more of the sensors 210 and/or input elements 212 and location data indicative of a location of the wearable device 204. For example, the wearable device 204 can include a network interface (not shown) that identifies geolocation data for the wearable device 204 upon the occurrence of the event 202.

The server device 206 includes an address identification mechanism 216, which may, for example, be the address identification mechanism 116 shown in FIG. 1. The address identification mechanism 216 can receive location data from the wearable device 204. The address identification mechanism 216 can use the location data to query the map system 208 for a street address corresponding to geolocation coordinates included in the location data. In response to the query, the server device 206 can receive the street address corresponding to (or closely matching) the location data. For example, if the coordinates to not match a street address, the address identification mechanism 216 can determine a direction and distance from a closest street address. The street address (and direction and distance, as applicable) can be the address-based location data 200.

Implementations of the system of FIG. 2 for generating the address-based location data 200 can include additional, less, or combined functionality as compared to that described above, or functionality other than that described above, or combinations thereof. In some implementations, the wearable device 204 can omit the input engine 214. For example, the sensors 210 can include a dedicated mechanism for indicating that one or more of the sensors 210 have taken some measurements. In another example, the input elements 212 can include a dedicated mechanism for indicating that one or more of the input elements 212 have received some user input. A dedicated mechanism can include instructions included in firmware or other aspects of the sensors 210, the input elements 212, another component of the wearable device 204, or a combination thereof. The dedicated mechanism can include functionality for causing a transmission of the measurement and/or user input, such as by causing a network interface of the wearable device 204 to broadcast that measurement and/or user input to the server device 206.

Figure 3:
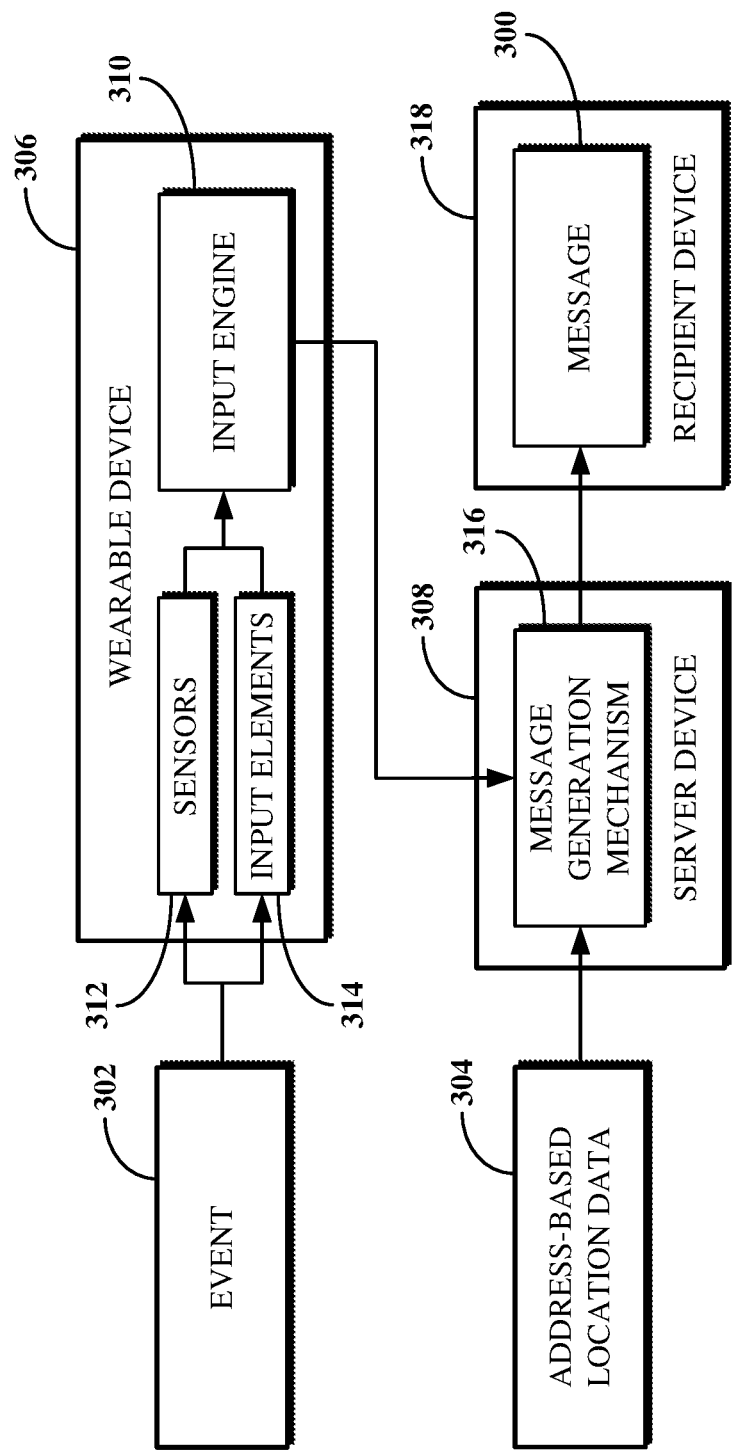
FIG. 3 is a block diagram of an example of generating a message based on an event and address-based location data.

FIG. 3 is a block diagram of an example of generating a message 300 based on an event 302 and address-based location data 304. The event 302 and the address-based location data 304 may, for example, respectively be the event 202 and the address-based location data 200 shown in FIG. 2. The message 300 can be generated based on data received from or processed by a wearable device 306 and a server device 308, which may, for example, be the wearable device 204 and the sever device 206 shown in FIG. 2.

Measurement data can be generated by an input engine 310 of the wearable device 306, such as based on data measured by sensors 312 and/or received as user input using input elements 314. The input engine 310, the sensors 312, and the input elements 314 may, for example, respectively be the input engine 214, the sensors 210, and the input elements 212 shown in FIG. 2. The server device 308 includes a message generation mechanism 316, which, for example, may be the message generation mechanism 118 shown in FIG. 1.

The message generation mechanism 316 can generate the message 300 based on the measurement data generated by the input engine 310 and the address-based location data 304. Once the message is generated, it is transmitted to a recipient device 318, which may, for example, be the recipient device 108 shown in FIG. 1. Although the message 300 is shown in the figure as being included within the recipient device 318, the message 300 is generated by the server device 308 before it is transmitted to the recipient device 318. As such, FIG. 3 depicts the message 300 in a post-transmission state.

Implementations of the system of FIG. 3 for generating the message 300 can include additional, less, or combined functionality as compared to that described above, or functionality other than that described above, or combinations thereof. In some implementations, the wearable device 306 can omit the input engine 310. For example, the sensors 312 can include a dedicated mechanism for indicating that one or more of the sensors 312 have taken some measurements. In another example, the input elements 314 can include a dedicated mechanism for indicating that one or more of the input elements 314 have received some user input. A dedicated mechanism can include instructions included in firmware or other aspects of the sensors 312, the input elements 314, another component of the wearable device 306, or a combination thereof. The dedicated mechanism can include functionality for causing a transmission of the measurement and/or user input, such as by causing a network interface of the wearable device 306 to broadcast that measurement and/or user input to the server device 308.

Figure 4:
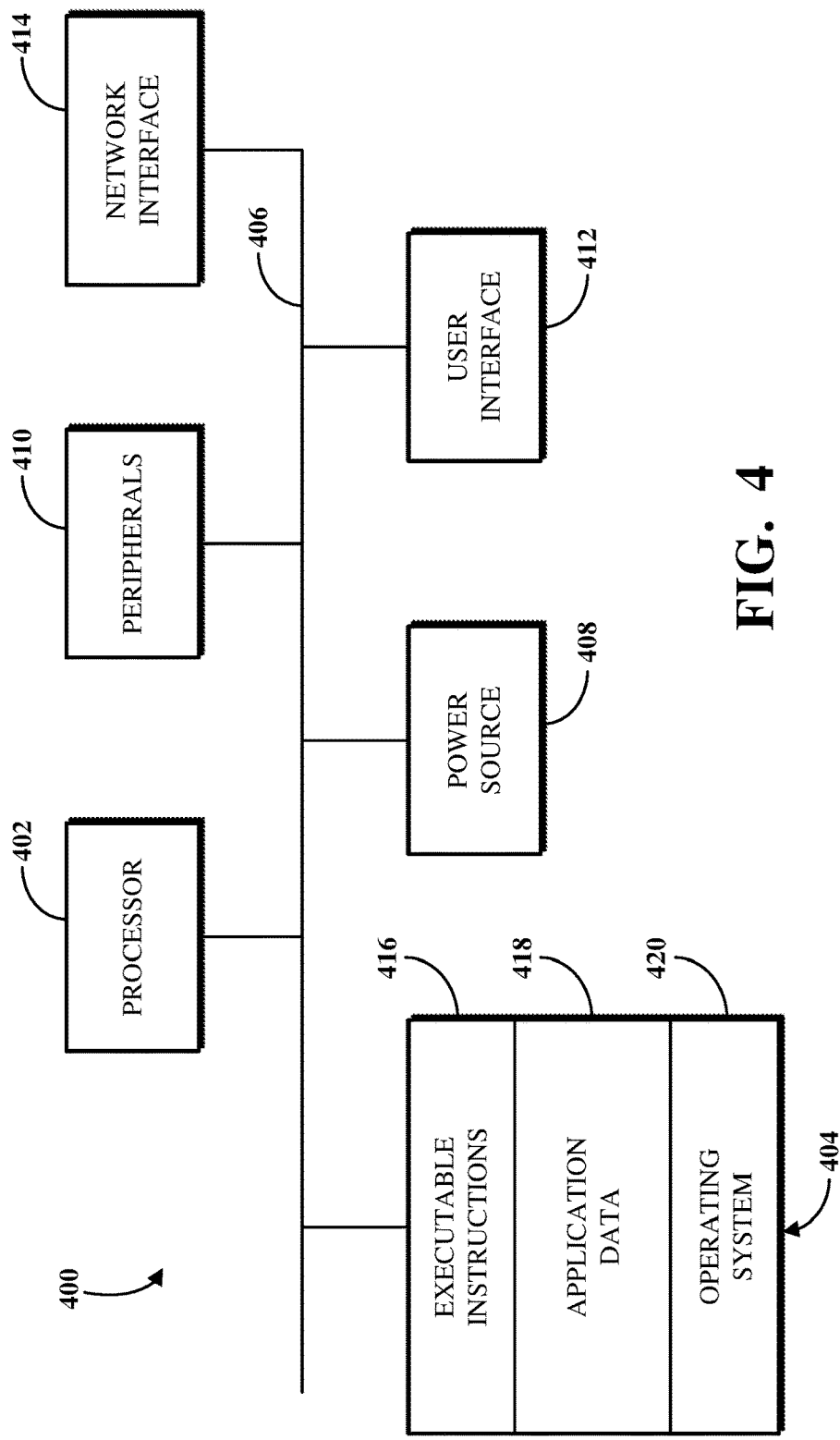
FIG. 4 is a block diagram of an example internal configuration of a computing device.

FIG. 4 is a block diagram of an example internal configuration of a computing device 400. The computing device 400 includes components or units, such as a processor 402, a memory 404, a bus 406, a power source 408, peripherals 410, a user interface 412, and a network interface 414. One of more of the memory 404, the power source 408, the peripherals 410, the user interface 412, or the network interface 414 can communicate with the processor 402 via the bus 406. For example, one or more of the wearable device 100, the connected device 102, the server device 104, or the recipient device 108 shown in FIG. 1 can be the computing device 400.

The processor 402 is a central processing unit (CPU), such as a microprocessor, and can include single or multiple processors having single or multiple processing cores. Alternatively, the processor 402 can include another type of device, or multiple devices, now existing or hereafter developed, configured for manipulating or processing information. For example, the processor 402 can include multiple processors interconnected in any manner, including hardwired or networked, including wirelessly networked. For example, the operations of the processor 402 can be distributed across multiple devices or units that can be coupled directly or across a local area or other suitable type of network. The processor 402 can include a cache, or cache memory, for local storage of operating data or instructions.

The memory 404 includes one or more memory components, which may be volatile memory or non-volatile memory. For example, the volatile memory of the memory 404 can be a DRAM module (e.g., DDR SDRAM) or another form of volatile memory. In another example, the non-volatile memory of the memory 404 can be a disk drive, a solid state drive, flash memory, Phase-Change Memory (PCM), or another form of non-volatile memory configured for persistent electronic information storage. The memory 404 may also include other types of devices, now existing or hereafter developed, configured for storing data or instructions for processing by the processor 402.

The memory 404 can include data for immediate access by the processor 402. For example, the memory 404 can include executable instructions 416, application data 418, and an operating system 420. The executable instructions 416 can include one or more application programs, which can be loaded or copied, in whole or in part, from non-volatile memory to volatile memory to be executed by the processor 402. For example, the executable instructions 416 can include instructions for generating or transmitting messages indicative of events or address-based location information. The application data 418 can include user data, database data (e.g., database catalogs or dictionaries), or the like. The operating system 420 can be, for example, Microsoft Windows®, Mac OS X®, or Linux®, an operating system for a small device, such as a smartphone or tablet device; or an operating system for a large device, such as a mainframe computer.

The power source 408 includes a source for providing power to the computing device 400. For example, the power source 408 can be an interface to an external power distribution system. In another example, the power source 408 can be a battery, such as where the computing device 400 is configured to operate independently of an external power distribution system.

The peripherals 410 includes one or more sensors, detectors, or other devices configured for monitoring the computing device 400 or the environment around the computing device 400. For example, the peripherals 410 can include a geolocation component, such as a GPS location unit. In another example, the peripherals can include a temperature sensor for measuring temperatures of components of the computing device 400, such as the processor 402.

The user interface 412 includes one or more input or output components. Examples of input our output components of the user interface 412 include a display, such as a liquid crystal display (LCD), a cathode-ray tube (CRT), a light emitting diode (LED) display (e.g., an OLED display), or other suitable display; a positional input device, such as a mouse, touchpad, touchscreen, or the like; a keyboard; or other suitable human or machine interface devices.

The network interface 414 provides a connection or link to a network, for example, the Internet, a local area network (LAN), a wide area network (WAN), a virtual private network (VPN), or another public or private network. The network interface 414 can be a wired network interface or a wireless network interface. The computing device 400 can communicate with other devices via the network interface 414 using one or more network protocols, such as using Ethernet, TCP, IP, power line communication (PLC), Wi-Fi, Bluetooth® (e.g., BLUE), infrared, GPRS, GSM, CDMA, other protocols, or a combination thereof.

Implementations of the computing device 400 of FIG. 4 can include additional, less, or combined functionality as compared to that described above, or functionality other than that described above, or combinations thereof. In some implementations, the computing device 400 can omit the peripherals 410. In some implementations, the memory 404 can be distributed across multiple devices. For example, the memory 404 can include network-based memory or memory in multiple clients or servers performing the operations of those multiple devices. In some implementations, the application data 418 can include functional programs, such as a web browser, a web server, a database server, another program, or a combination thereof.

Figure 5:
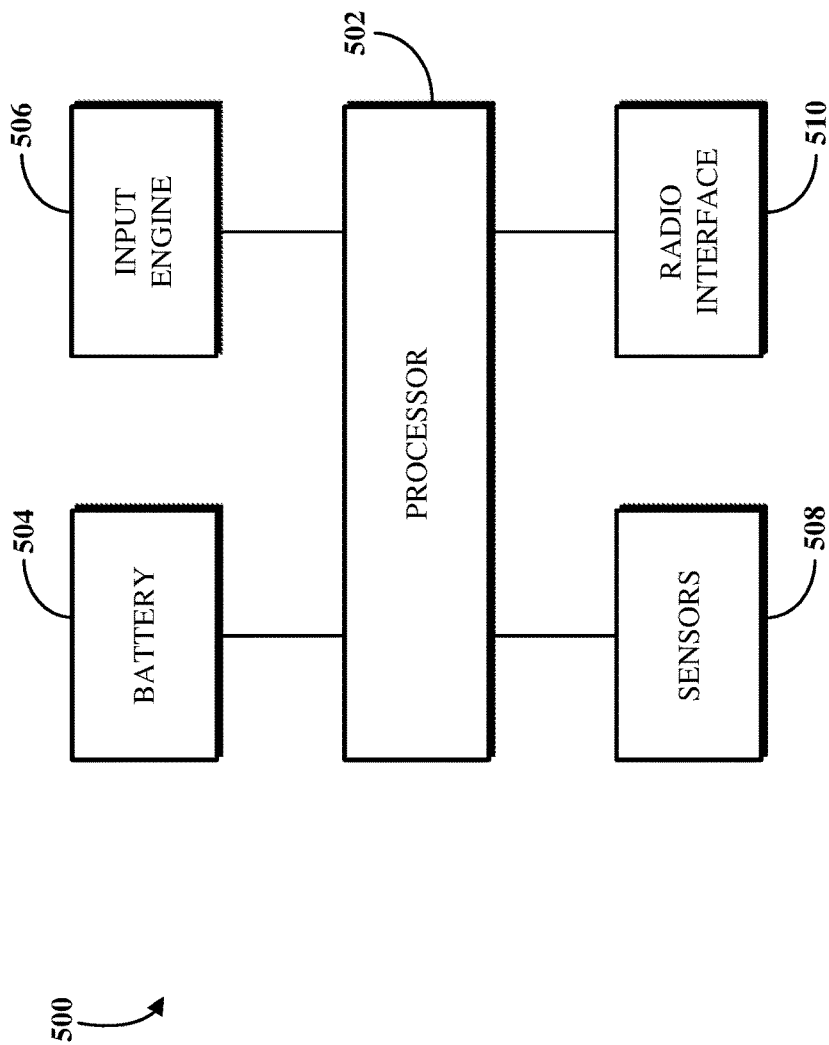
FIG. 5 is a block diagram of an example internal configuration of a wearable device.

FIG. 5 is a block diagram of an example internal configuration of a wearable device 500. The wearable device 500 may, for example, be the wearable device 100 shown in FIG. 1. The wearable device 500 can be an implementation of the computing device 400 shown in FIG. 4. The wearable device 500 includes a processor 502, a battery 504, an input engine 506, sensors 508, and a radio interface 510. The processor 502 can be a processor, such as the processor 402 shown in FIG. 4. The battery 504 can be a lithium cell or other battery for supplying power to the wearable device 500. For example, the battery 504 can include an implementation of the power source 408 shown in FIG. 4.

The input engine 506 may, for example, be the input engine 214 shown in FIG. 2 and the input engine 310 shown in FIG. 3. The input engine 506 can be or otherwise include executable instructions, such as may be stored in a memory component. For example, the input engine 506 can be or include the executable instructions 416 of the memory 404 shown in FIG. 4. The sensors 508 can be the sensors 110 shown in FIG. 1. For example, the sensors 508 can include one or more of an accelerometer, a PPG, an ECG, or the like. In another example, the sensors 508 can include a geolocation component (e.g., a GPS unit), as a geolocation sensor. The radio interface 510 can be an implementation of the network interface 414 shown in FIG. 4. For example, the radio interface 510 can include a radio transceiver using one or more of Bluetooth® (e.g., BLE), Wi-Fi, LTE, other cellular protocols, or the like.

Implementations of the wearable device 500 of FIG. 5 can include additional, less, or combined functionality as compared to that described above, or functionality other than that described above, or combinations thereof. In some implementations, the wearable device 500 can include a memory, such as the memory 404 shown in FIG. 4. For example, the memory of the wearable device 500 can store data generated using the input engine 506 in situations where the radio interface 510 cannot communicate that data to another device (e.g., a relaying device or a server device). For example, the memory of the wearable device 500 can be implemented as a ring buffer such that the newest generated data is stored and oldest generated data is evicted to make room for the newest generated data. In some implementations, the memory of the wearable device 500 can store historical records of the data generated using the input engine 506, such as even after the data is transmitted to another device. In some implementations, the wearable device 500 can include input elements, such as the input elements 112 shown in FIG. 1.

To further describe some implementations in greater detail, reference is next made to examples of techniques performable within a wearable device notification framework. The techniques described herein can be executed using computing devices, such as included within or otherwise using the systems, modules, and devices described with respect to FIGS. 1-5. The techniques described herein can be performed, for example, by executing a machine-readable program or other computer-executable instructions, such as routines, instructions, or programs described according to JavaScript, C, or other such routines or instructions. The steps, or operations, of the techniques described herein or any other technique, method, process, or algorithm described in connection with the implementations disclosed herein can be implemented directly in hardware, firmware, software executed by hardware, circuitry, or a combination thereof Although the techniques described herein are each shown as a series of operations for clarity, implementations of those techniques or any other method, technique, process, and/or algorithm described in connection with the implementations disclosed herein can be performed in various orders and/or concurrently. Additionally, operations in accordance with this disclosure can be performed with other operations not presented and described herein. Furthermore, one or more aspects of the systems and techniques described herein can be omitted.

Figure 6:
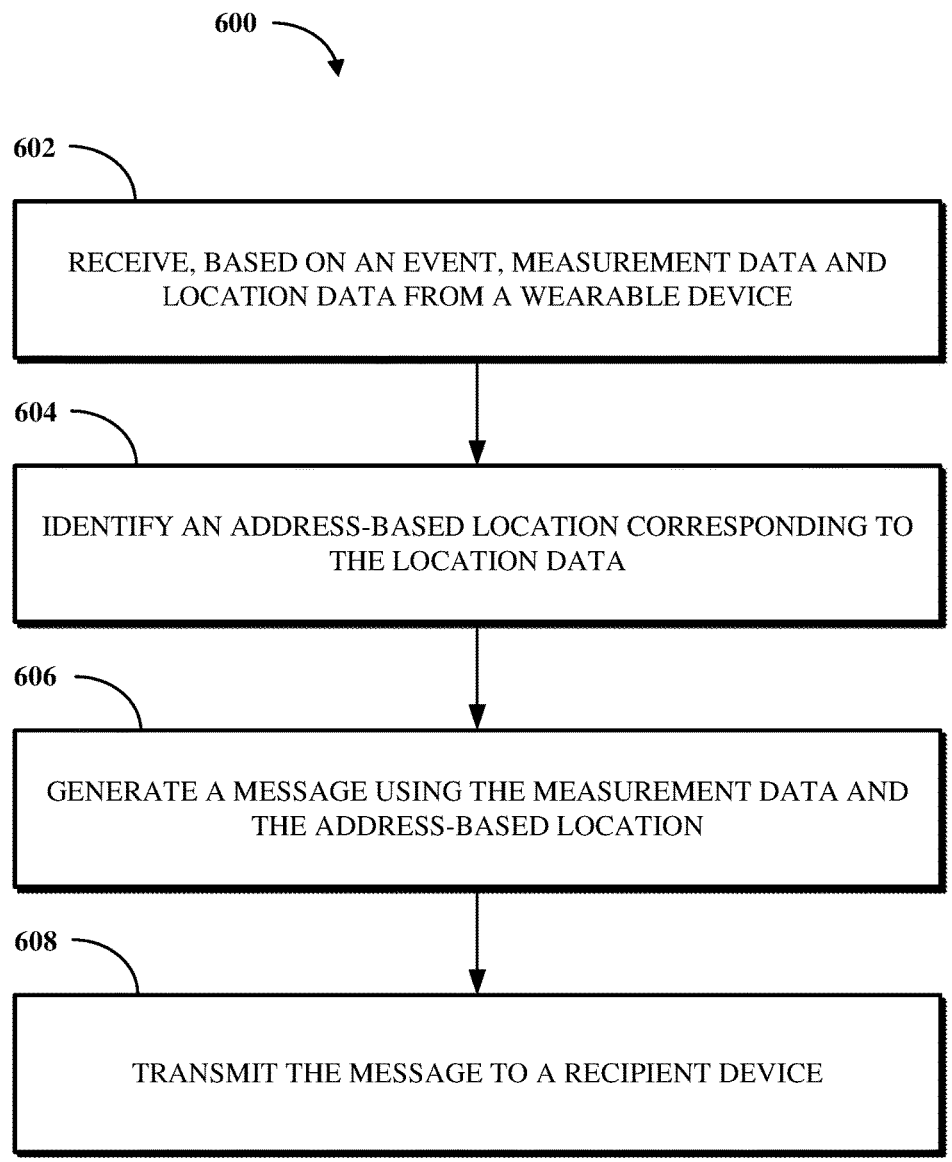
FIG. 6 is a flowchart illustrating an example of a technique for generating and transmitting messages within a wearable notification framework.

FIG. 6 is a flowchart illustrating an example of a technique 600 for generating and transmitting messages within a wearable notification framework. For example, the technique 600 can be performed by executing instructions at a server device, such as the server device 104 shown in FIG. 1. At 602, measurement data and location data are received from a wearable device. The measurement data and location data are generated based on an event. For example, the event may occur with respect to the wearable device, the user of the wearable device, or both. The measurement data and location data can be generated by an input engine of the wearable device, such as based on measurements taken by one or more sensors of the wearable device or user input received using one or more input elements of the wearable device.

At 604, an address-based location corresponding to the location data is identified. Identifying the address-based location using the location data received from the wearable device can include querying a map system for map data based on the location data. For example, the location data can include geolocation data, such as latitude and longitude coordinates, that can be identified within the map data of the map system. The map system can include information associating those coordinates with a street address. For example, the coordinates may match the location of a street address. The street address can be returned as the address-based location. In another example, the coordinates may not match the location of a street address, but a nearest street address to the coordinates can be identified. A distance and direction indicating the proximity of the coordinates to that nearest street address, as well as that nearest street address, can be returned as the address-based location.

At 606, a message is generated using the measurement data received from the wearable device and the address-based location identified using the location data. The message can be generated to include a name or like identifier of a user of the wearable device, an indication of the event that occurred (e.g., as measured or otherwise indicated or detected based on the sensors and/or input elements of the wearable device), and the address-based location (e.g., the street address and, as applicable, the distance and direction thereto). At 608, the message is transmitted to a recipient device. The recipient device may be a device designated to receive the message, such as using a companion application executed on a connected device of the user of the wearable device, a portal provided using the server device or another device operated wholly or partially by the provider operating the server device, another device, or a combination thereof.

In some implementations, receiving the measurement data and the location data from the wearable device can include receiving the measurement data and the location data from a relaying device configured to communicate the data received from the wearable device. For example, a relaying device, such as a connected device or a router/gateway, can receive the measurement data and the location data from the wearable device and relay same to a server device to identify the address-based location and generate and transmit the message. In another example, the relaying device can receive the measurement data and not the location data from the wearable device. The relaying device can generate the location data based on the measurement data received from the wearable device. For example, the wearable device can broadcast a signal including the measurement data. The relaying device can identify a location of the broadcast and determine geolocation coordinates associated therewith.

Figure 7:
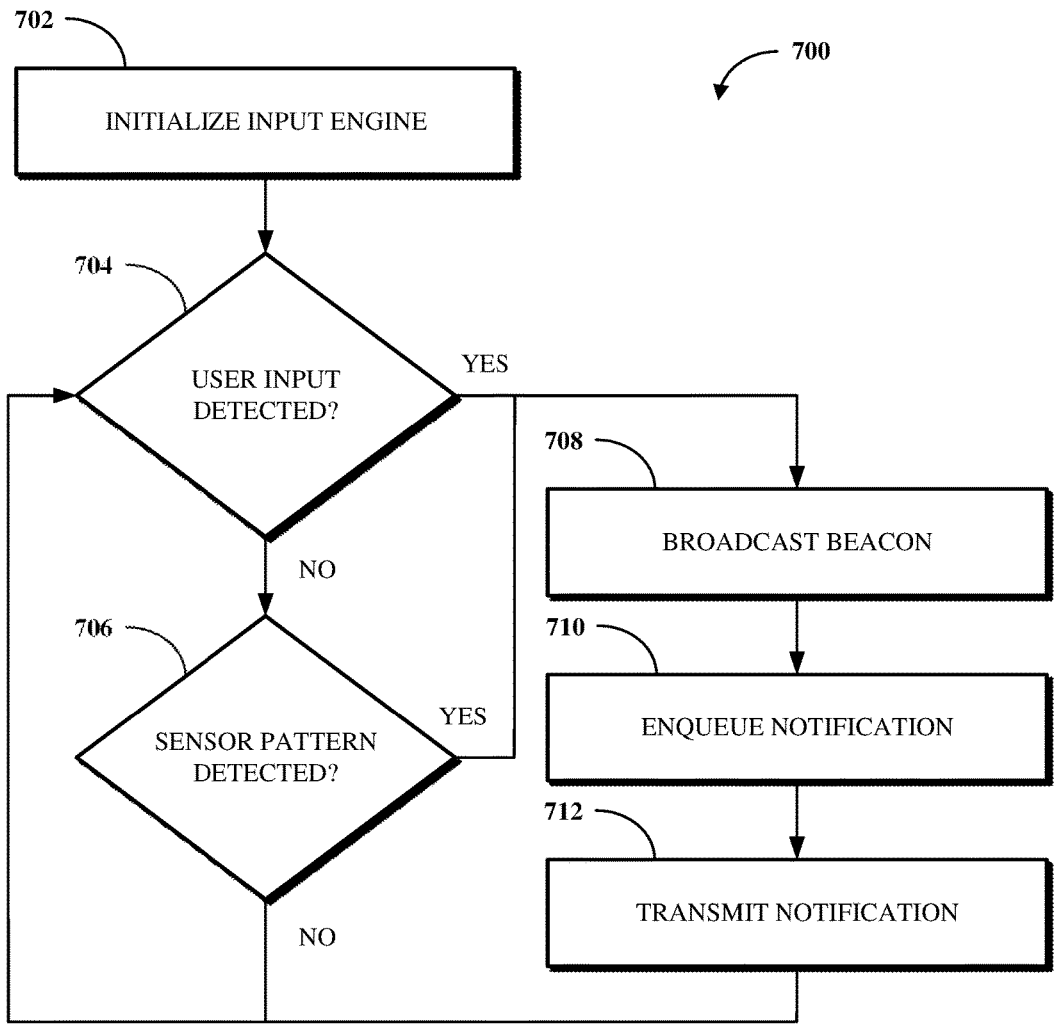
FIG. 7 is a flowchart illustrating an example of a technique for transmitting notifications from a wearable device.

FIG. 7 is a flowchart illustrating an example of a technique 700 for transmitting notifications from a wearable device. For example, the technique 700 can be performed by executing instructions at a wearable device, such as the wearable device 100 shown in FIG. 1. At 702, an input engine of the wearable device is initialized. The input engine includes instructions for identifying that measurements taken by one or more sensors of the wearable device and/or user input received by one or more input elements of the wearable device is to be used to generate a notification indicative of an event. The notification can be transmitted to a server device (e.g., the server device 104 shown in FIG. 1) for use in generating a message indicative of the event, including data indicating an address-based location of the wearable device.

Determinations are made at 704 and 706 as to whether input that can be used to generate and transmit a notification has been received. The input can refer to explicit input, for example, as may be explicitly received using one or more input elements of the wearable device. The input can also or instead refer to implicit input, for example, as may be implicitly received based on measurements taken using one or more sensors of the wearable device. However, explicit input may in some cases also refer to measurements taken using one or more sensors. Similarly, implicit input may in some cases also refer to input received using one or more input elements. For example, explicit input can include a specific gesture or movement intentionally performed by the user of the wearable device that, when measured by a sensors of the wearable device, indicates a specific event associated with that gesture or movement.

At 704, a determination is made as to whether user input is detected. The determination of whether user input is detected can include the input engine detecting whether user input has been received using one or more input elements of the wearable device. For example, the input engine can monitor the input elements for a button press, a touch contact, a continuous or pattern of taps, or the like, or a combination thereof. If no user input is detected, the technique 700 continues to 706, where a determination is made as to whether a sensor pattern is detected. A sensor pattern can refer to a predefined (e.g., default or configured) sequence of measurements that, if measured by one or more sensors of the wearable device, can indicate an associated event. As such, the determination of whether a sensor pattern is detected can include the input engine detecting whether one or more measurements comprising a sensor pattern has been taken. For example, the input engine can monitor the sensors of the wearable device for a measurement indicating a gesture, altitude, location (e.g., indoor or outdoor), PPG pattern (e.g., a heart rate), ECG pattern (e.g., atrial fibrillation or ventricular fibrillation), or the like, or a combination thereof.

If no sensor pattern is detected, the technique 700 returns to 704 and repeats the determinations at 704 and 706 until a respective determination indicates that user input or a sensor pattern is detected. If user input is detected at 704 or a sensor pattern is detected at 706, a notification is generated based on the detected user input or sensor pattern. The notification can include user input receiving using input elements, measurements taken using sensors, other information associated with the wearable device or user thereof (e.g., the name of or another identifier for the user, a serial or model number of the wearable device, or the like), a timestamp at which the user input were received and/or the measurements were taken, other data, or a combination thereof.

At 708, a beacon is broadcast. The beacon can, for example, be a BLE beacon indicating that data will be transmitted from the wearable device. The beacon can be broadcasted to one or more devices configured to receive beacons, such as devices with BLE capacity. For example, the wearable device can be configured to broadcast the beacon to a server device that will use the notification to generate a message indicative of an event. In another example, such as where a network connection is not available to the wearable device or where the wearable device does not include a network interface, the wearable device can be configured to broadcast the beacon to a connected device executing a companion application associated with the wearable device (e.g., the connected device 102 and the companion application 114 shown in FIG. 1).

At 710, the notification is enqueued for transmission. Enqueuing the notification can include preparing the notification for transmission by the wearable device. For example, the wearable device can include functionality for transmitting one notification at a time. The functionality of the wearable device can include verifying that a first notification has been transmitted before attempting to transmit a second notification. At 712, the enqueued notification is transmitted, such as to a server device or a relaying device that will then transmit the enqueued notification to the server device.

In some implementations, the determination of whether a sensor pattern is detected can be performed before the determination of whether user input is detected. In some implementations, those determinations can be performed simultaneously (or near simultaneously, subject to limitations of the hardware used to implement the technique 700). In some implementations, enqueuing the notification at 710 can include generating the notification based on the user input or sensor pattern detected at 704 or 706, respectively. In some implementations, enqueuing the notification at 710 can include generating a request to transmit with the notification. For example, where the wearable device is not capable of detecting its location (e.g., because it does not include a geolocation component, a network connection is not available to it, or the like), a request can be generated that, when received by a relaying device (e.g., a connected device executing a companion application), will direct the relaying device to detect the location of the wearable device and include that location with the data in the notification. The location data detected by the relaying device is then transmitted with the notification generated by the wearable device to the server device.

Figure 8:
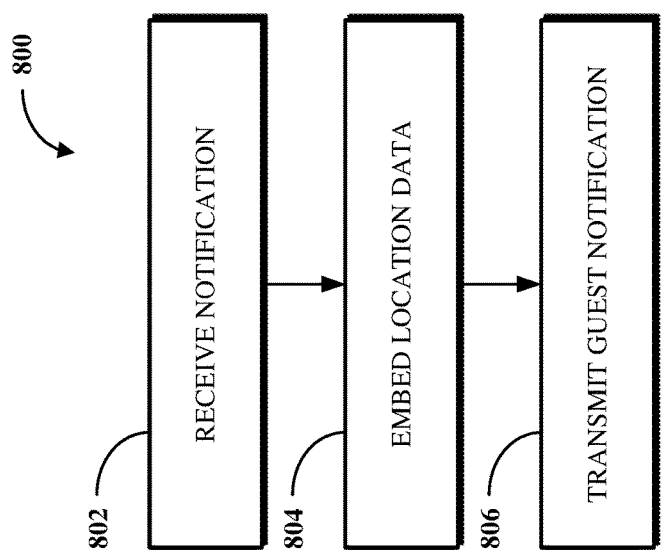
FIG. 8 is a flowchart illustrating an example of a technique for embedding location data using a beacon listener.

FIG. 8 is a flowchart illustrating an example of a technique 800 for embedding location data using a beacon listener. For example, the technique 800 can be performed by executing instructions at a connected device, such as the connected device 102 shown in FIG. 1. For example, the instructions executed at the connected device can be or be included as part of a companion application, such as the companion application 114 shown in FIG. 1. The technique 800 can be performed to include location data within a notification generated by a wearable device before the notification is transmitted to a server device (e.g., the server device 104 shown in FIG. 1) based on a beacon broadcast to the device performing the technique 800. For example, the technique 800 can be performed using the Apple® iBeacon Listener or other application software or devices configured to receive beacons broadcasted from a wearable device.

At 802, a notification is received from a wearable device. The notification can be received from the wearable device after a beacon is broadcasted to a device implementing the technique 800. For example, a device implementing the technique 800 can include a beacon listener for listening for broadcasted beacons from the wearable device (or other devices). The notification may include measurement data indicating measurements taken by sensors of the wearable device and/or user input received by input elements of the wearable device. However, the notification may omit location data indicating a location (e.g., a geolocation, such as latitude and longitude coordinates) of the wearable device. For example, the notification may omit the location date because the wearable device does not include a geolocation component, a network connection is not available to the wearable device, or the like.

At 804, location data is embedded into the notification. Embedding the location data includes determining the location data and then including the determined location data in the notification. Determining the location data can include using metadata or other data of the notification as received from the wearable device to detect a geolocation of the wearable device. For example, a beacon broadcast by the wearable device can be detected at particular geolocation coordinates. The location data can then be determined to be or otherwise include those coordinates. Including the location data in the notification can include executing instructions to edit metadata or other data of the notification to include the location data.

At 806, the notification embedded with the location data can be transmitted to a server device. For example, the notification transmitted at 806 can be a guest notification because the notification was received at 802 based on a broadcasted beacon. For example, in some cases, the device implementing the technique 800 may not be a device operated by the user of the wearable device that broadcasts the beacon. For example, the technique 800 can be performed by a router/gateway having BLE capacity that receives the beacon broadcasted from the wearable device.

In some implementations, the technique 800 can include initiating a telephone call (e.g., for leaving a voice message) or sending a text message to a designated telephone number, such as of a recipient device or other connected device. In some implementations, the technique 800 can include using the companion application to embed data and then share the guest notification within other application software. For example, the other application software can be an email client executing on the connected device. The guest notification can be shared with the email client with instructions for the email client to generate and transmit an email based on the guest notification, such as to a designated email address.

Figure 9:
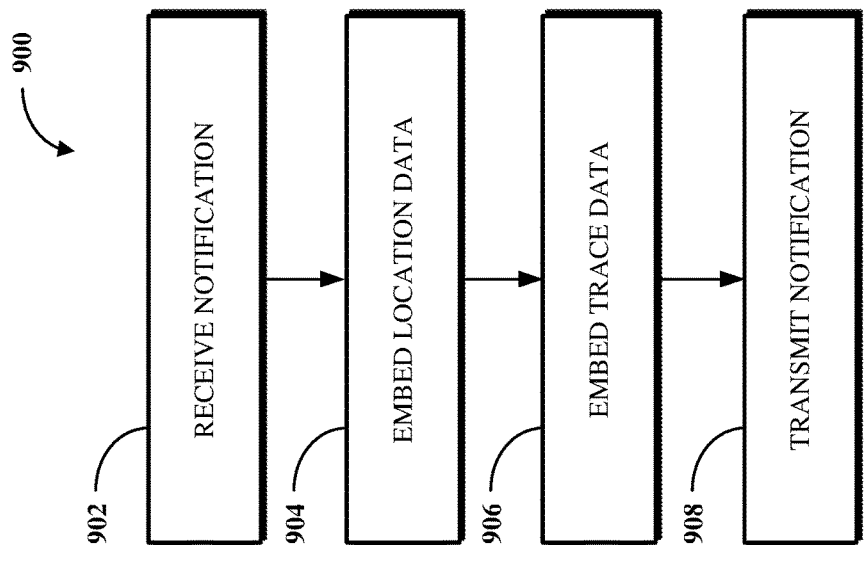
FIG. 9 is a flowchart illustrating an example of a technique for embedding location data using a notification listener.

FIG. 9 is a flowchart illustrating an example of a technique 900 for embedding location data using a notification listener. For example, the technique 900 can be performed by executing instructions at a connected device, such as the connected device 102 shown in FIG. 1. For example, the instructions executed at the connected device can be or be included as part of a companion application, such as the companion application 114 shown in FIG. 1. The technique 900 can be performed to include location data within a notification generated by a wearable device before the notification is transmitted to a server device (e.g., the server device 104 shown in FIG. 1).

At 902, a notification is received from a wearable device. For example, a companion application can be configured to receive notifications transmitted from the wearable device, such as without requiring that the notifications be broadcast by the wearable device. For example, the notification can be designated for receipt at the connected device executing the companion application. The notification may include measurement data indicating measurements taken by sensors of the wearable device and/or user input received by input elements of the wearable device. However, the notification may omit location data indicating a location (e.g., a geolocation, such as latitude and longitude coordinates) of the wearable device. For example, the notification may omit the location date because the wearable device does not include a geolocation component, a network connection is not available to the wearable device, or the like.

At 904, location data is embedded into the notification. Embedding the location data includes determining the location data and then including the determined location data in the notification. Determining the location data can include using metadata or other data of the notification as received from the wearable device to detect a geolocation of the wearable device. For example, a beacon broadcast by the wearable device can be detected at particular geolocation coordinates. The location data can then be determined to be or otherwise include those coordinates. Including the location data in the notification can include executing instructions to edit metadata or other data of the notification to include the location data.

At 906, trace data is embedded into the notification. The trace data can include information about the connected device or other device implementing the technique 900, such as may be collected and used by a server device to which the notification is later transmitted. For example, the trace data can include data indicating a model number or serial number of the device, an operating system running on the device, network configuration information for the device (e.g., networks accessible using the device), or the like, or a combination thereof. At 908, the notification embedded with the location data and the trace data can be transmitted to a server device.

In some implementations, the technique 900 can include initiating a telephone call or sending a text message to a designated telephone number, such as of a recipient device or other connected device. In some implementations, the technique 900 can include using the companion application to embed data and then share the notification within other application software. For example, the other application software can be an email client executing on the connected device. The notification can be shared with the email client with instructions for the email client to generate and transmit an email based on the notification, such as to a designated email address.

Figure 10:
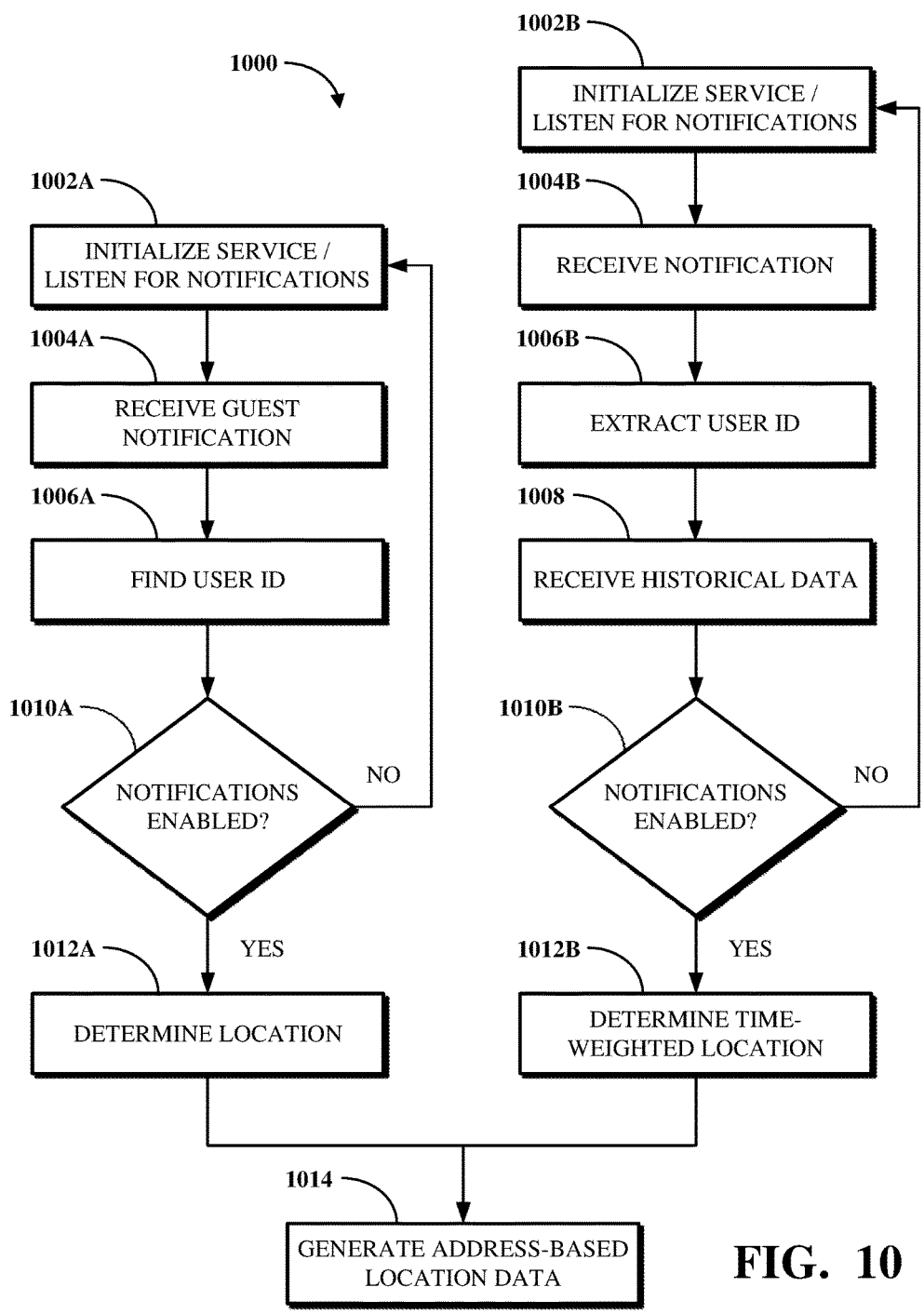
FIG. 10 is a flowchart illustrating an example of a technique for generating address-based location data.

FIG. 10 is a flowchart illustrating an example of a technique 1000 for generating address-based location data. For example, the technique 1000 can be performed by executing instructions at a server device, such as the server device 104 shown in FIG. 1. For example, the instructions executed at the server device can be or be included as part of an address identification mechanism, such as the address identification mechanism 116 shown in FIG. 1. The technique 1000 includes two sets of operations that both result in the generating of address-based location data. A first set of operations is shown at 1002A, 1004A, 1006A, 1010A, and 1012A. A second set of operations is shown at 1002B, 1004B, 1006B, 1008, 1010B, and 1012B.

Referring to the first set of operations, a service is initialized at 1002A. Initializing the service can include executing instructions to configure the server device to receive notifications transmitted from a guest device, such as a device not operated by the user of a wearable device by which the notification is wholly or partially generated. For example, initialing the service can include opening a port of the server device used to receive data transmitted from another device over a network. In another example, initializing the service can include executing a script, batch file, or other software to configure the server device to receive data transmitted from another device over a network. Once the service is initialized, the server device can begin listening for notifications (e.g., guest notifications) transmitted to it.

At 1004A, a guest notification is received from another device. For example, the guest notification can be a notification transmitted from a device not operated by the user of the wearable device. For example, the guest notification can be received from a router/gateway having BLE capacity. The guest notification can include data indicative of an event associated with the wearable device, the user thereof, or both. For example, the guest notification can include measurement data generated by the wearable device. The guest notification can include location data embedded to the notification by the device that transmitted the guest notification to the server device. For example, the location data can be embedded to the notification as described using the technique 800 shown in FIG. 8.

At 1006A, a user identifier associated with the wearable device used to generate at least a portion of the notification can be found. Finding the user identifier can include the server device using all or a portion of the data included in the guest notification to query a database or other data store for a user identifier. For example, the server device can have access to a database including data associating user identifiers with device identifiers. The guest notification can include data indicating a MAC address of the wearable device. The finding the user identifier can include querying the database based on then MAC address to find a user identifier associated with that MAC address. The user identifier can be a name of the user of the wearable device. Alternatively, the user identifier can be a username or other identifier used to identify the user.

At 1010A, a determination is made as to whether notifications are enabled for the user associated with the found user identifier. For example, notifications may not be enabled where the user has disabled or otherwise opted-out of the wearable device notification framework, such as because he or she does not want to have messages indicative of his or her events be generated by the server device. In another example, notifications may not be enabled where the user has not designated a recipient device to which the server device can transmit a generated message. Notifications may, for example, be enabled by default. For example, the user associated with the user identifier may be required to designate at least one recipient device upon configuring the wearable device, a companion application for the wearable device, or the like.

If notifications are not enabled, the technique 1000 returns to 1002A where the server device continues to listen for guest notifications. If notifications are enabled, at 1012A, a location is determined based on the guest notification. Determining the location can include using the location data included in the guest notification to query a map system for map data (e.g., the map system 106 and the map data 120 shown in FIG. 1). The query can return a street address associated with the location data. For example, the street address may match geolocation coordinates included in the location data. In such a case, the query can return an on-road location of the wearable device based on that street address. In another example, the street address may be a nearest street address to those coordinates. In such a case, the location may be determined to include a distance from and direction relative to that nearest street address, and the query can return an off-road location of the wearable device based on that nearest street address, distance, and direction.

Referring next to the second set of operations, a service is initialized at 1002B. For example, the service can be initialized in a same or similar manner as the service initialized at 1002A. However, the service initialized at 1002B may be a service that configures the server device implementing the technique 1000 to receive notifications instead of (or in addition to) guest notifications. Once the service is initialized, the server device can begin listening for notifications transmitted to it.

At 1004B, a notification is received from another device. For example, the notification can be a notification transmitted from a device associated with the user of the wearable device. For example, the notification can be transmitted from the wearable device. In another example, the notification can be transmitted from a connected device executing a companion application associated with the wearable device. The notification can include measurement data generated by the wearable device and location data generated by the wearable device or another device from which the notification is received, such as where that other device embeds the location data within the notification prior to the notification being received by the server device.

At 1006B, a user identifier is extracted from the received notification. For example, the notification can include the user identifier. For example, the wearable device can embed the user identifier as metadata within the notification before it transmits the notification to the server device (or a connected device executing a companion application, as applicable). In another example, the connected device, upon receiving the notification from the wearable device, can embed the user identifier in the notification, such as using the companion application.

At 1008, historical data is received. Receiving the historical data can include receiving the historical data from a computing device responsive to the transmission of the notification to the server device, querying a database or other data store for the historical data based on the notification, identifying the historical data within the notification, or another manner by which to obtain the historical data. The historical data can include data associated with previous messages generated based on events associated with the wearable device. For example, the historical data can indicate another event that was detected using the wearable device within a threshold period of time (e.g., within the last five minutes).

In another example, the server device may receive the same notification multiple times at 1004B; however, the location data included in those same notifications may slightly differ. For example, the location data can indicate movement of the wearable device between times at which the notifications were generated or transmitted (e.g., a walking distance of the user of the wearable device over time). The historical data can thus include a trace of the movement of the wearable device. This trace of movement can be used to determine a time-weighted location for the wearable device, as described below. For example, a future location of the wearable device can be projected based on the time-weighted location.

At 1010B, a determination is made as to whether notifications are enabled for the user associated with the found user identifier. For example, the determination at 1010B can be the same as or similar to the determination made at 1010A. If notifications are not enabled, the technique 1000 can return to 1002B to continue listening for notifications. If notifications are enabled, at 1012B, a time-weighted location can be determined. For example, determining the time-weighted location can include querying a map system for map data based on the location data included in the received notification.

The query can return a street address associated with the location data. For example, the street address may match geolocation coordinates included in the location data. In such a case, the query can return an on-road location of the wearable device based on that street address. In another example, the street address may be a nearest street address to those coordinates. In such a case, the location may be determined to include a distance from and direction relative to that nearest street address, and the query can return an off-road location of the wearable device based on that nearest street address, distance, and direction.

The received historical data can then be used to project a time-weighted location of the wearable device based on the street address (and, as applicable, distance and direction data). Determining the time-weighted location can include using a classification technique to determine likely projections of the location of the wearable device over time. For example, a classification technique can include performing a k-nearest neighbors algorithm, a logical regression, a neural network-based algorithm, a deep-learning-based algorithm, or the like, or a combination thereof. Implementations for determining a time-weighted location are described below with respect to FIGS. 11A and 11B.

At 1014, the location determined at 1012A or the time-weighted location determined at 1012B is used to generate address-based location data. The address-based location data is data to be included in a message transmitted to a recipient device for identifying an on-road or off-road location of the wearable device. After generating the address-based location data, a message including the address-based location data can be enqueued into a message queue of the server device before the message is transmitted to a recipient device.

In some implementations, the technique 1000 can omit the initializing of the services at 1002A and 1002B. For example, the server device implementing the technique 1000 can be configured to listen for transmissions of notifications to it without requiring manual user intervention. For example, the server device can automatically receive notifications transmitted from a wearable device, a connected device, or a guest device (as applicable) upon the transmission of the notifications. In some implementations, one service can be initialized. For example, the operations performed at 1002A and 1002B can be combined into a single operation to initialize the one service used by the server device to process notifications and guest notifications. In some implementations, the technique 1000 can omit receiving the historical data at 1008.

Figure 11A:
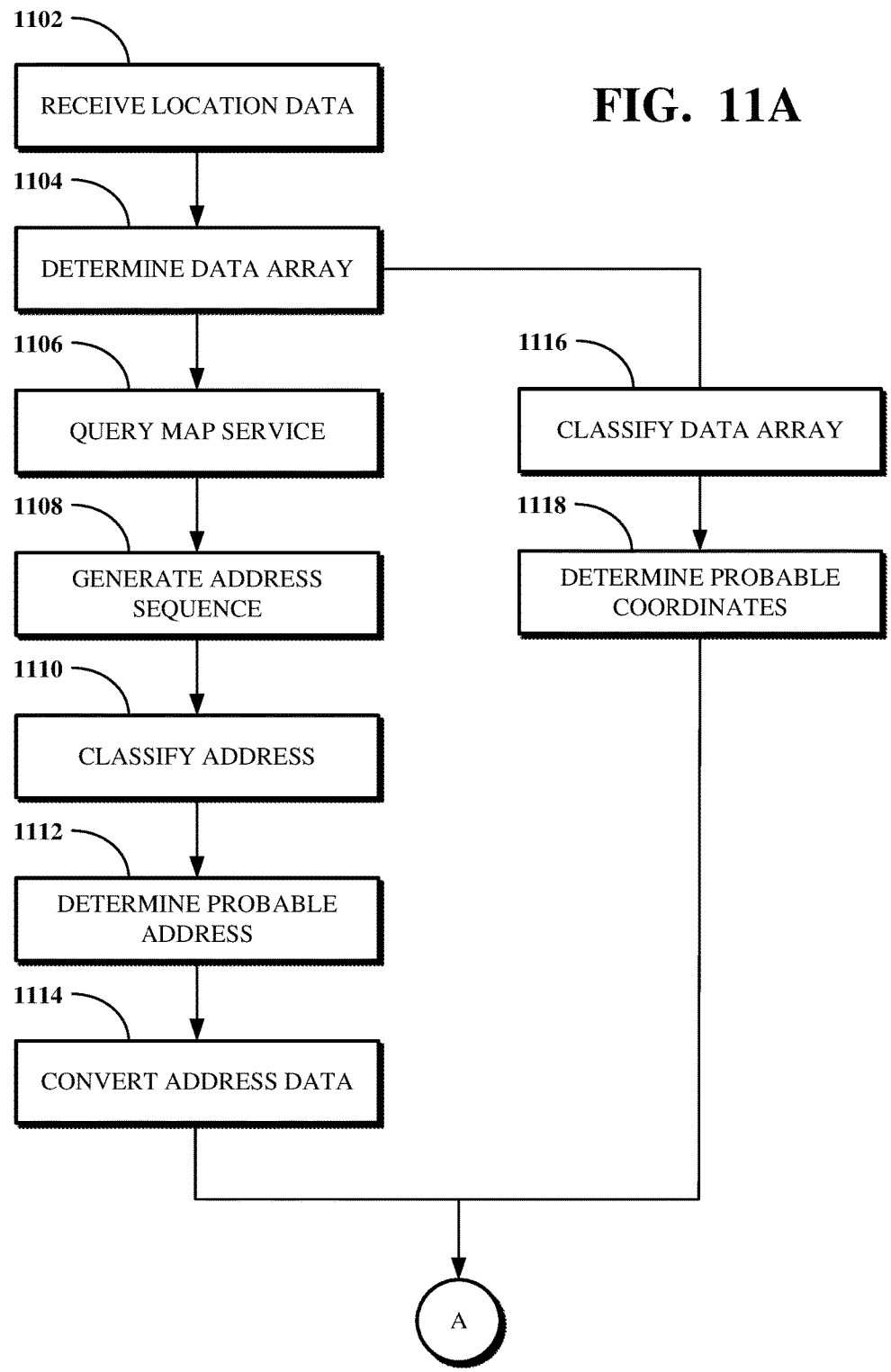
FIGS. 11A and 11B are flowcharts illustrating an example of a technique for generating a message indicative of an event using address-based location data.
Figure 11B:
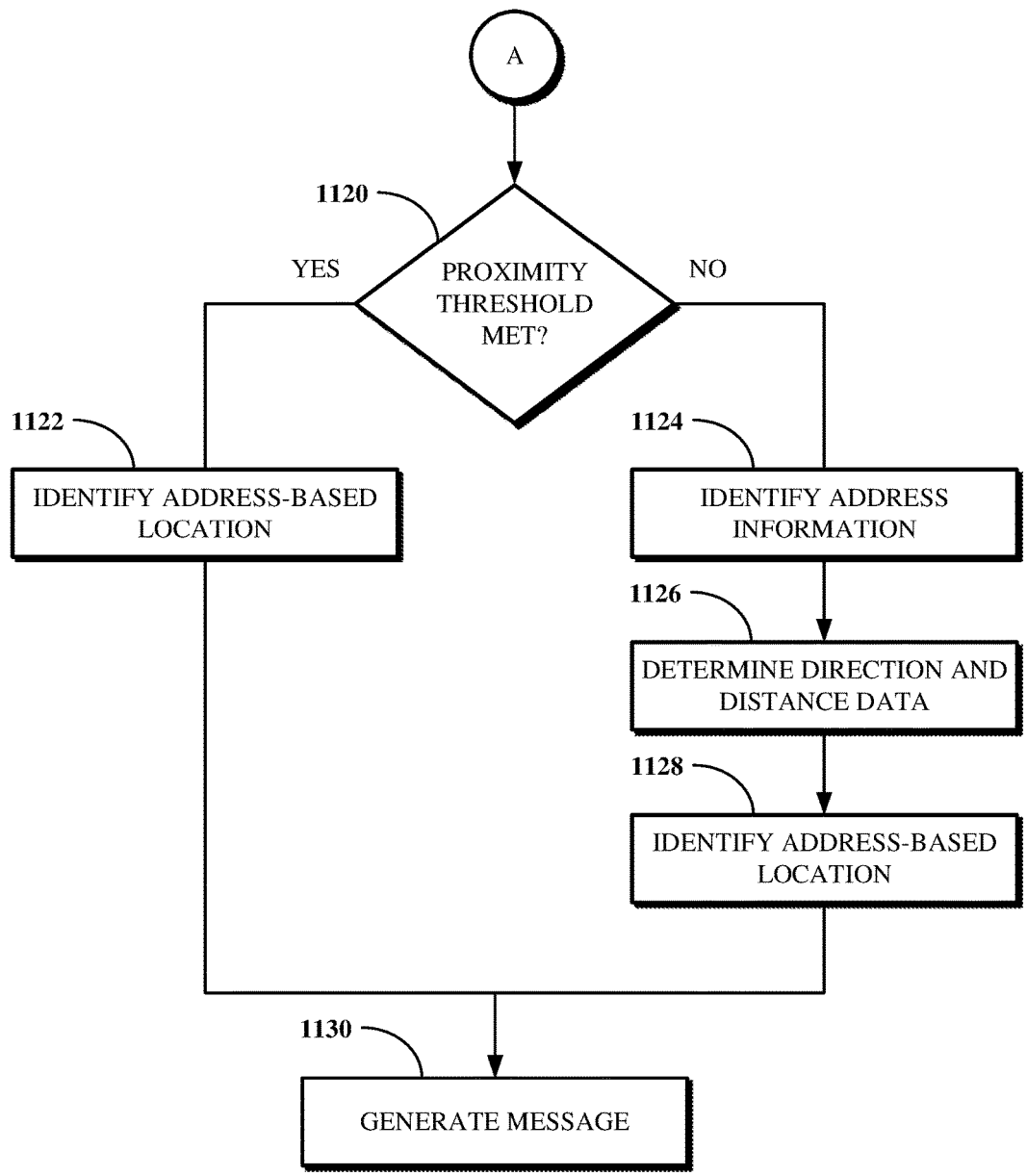

FIGS. 11A and 11B are flowcharts illustrating an example of a technique 1100 for generating a message indicative of an event using address-based location data. For example, the technique 1100 can be performed by executing instructions at a server device, such as the server device 104 shown in FIG. 1. For example, the instructions executed at the server device can be or be included as part of an address identification mechanism and/or a message generation mechanism, such as the address identification mechanism 116 or the message generation mechanism 118 shown in FIG. 1.

The technique 1100 can be performed to determine an on-road or off-road location of a wearable device. For example, the user of the wearable device may not always be at a location that is known to map systems (e.g., street addresses, indicated as on-road locations). As such, an off-road location can be determined in those cases to provide an accurate location for the wearable device within a message transmitted to a recipient device.

At 1102, location data is received. The location data can include geolocation coordinates determined, for example, using a GPS unit of a wearable device or a connected device in communication with a wearable device. The location data includes geolocation coordinates including a latitude coordinate and a longitude coordinate. The location data can also include a time value indicative of a time at which the geolocation coordinates were determined. In particular, the location data can include multiple sets of geolocation coordinates determined over a period of time. For example, a sequence of geolocation coordinates can be received from the wearable device or the connected device over a five or ten minute period. The sets of geolocation coordinates of the sequence may reflect different locations of the wearable device, such as where the wearable device has moved since a first determined geolocation coordinate set.

At 1104, a data array is determined based on the received location data. The data array may, for example, reflect the sequence of geolocation coordinates, such as according to the times at which the respective geolocation coordinates thereof were determined. For example, the data array can be ordered such that the earliest determined geolocation coordinates are indexed in a first position of the data array and the most recently determined geolocation coordinates are indexed in a last position of the data array. A time weight may be determined based on the times associated with the respective entries in the data array. For example, the time weight can be a function of the period of time that has elapsed between when the earliest and most recent geolocation coordinates were determined.

At 1106, a map service is queried based on the determined data array to determine a street address that matches or most closely matches the geolocation coordinates of the data array. At 1108, the address is then used with the time value included in the data array to generate an address sequence. The address sequence can be a tuple or other array including the street address determined at 1106 and the time value included in the data array.

At 1110, the address included in the address sequence is classified using a classification technique. As described above, the classification technique may, for example, include performing a k-nearest neighbors algorithm, a logical regression, a neural network-based algorithm, a deep-learning-based algorithm, or the like, or a combination thereof. For example, the address sequence can include a plurality of addresses determined based on multiple sets of geolocation coordinates over a period of time. The latest address added to the address sequence can be the address returned by the query at 1106.

At 1112, a most probable address is determined based on the classification at 1110. The most probable address can reflect a street address that most closely corresponds to the sets of geolocation data included in the address sequence. At 1114, the most probable address is converted into geolocation coordinates. For example, map data can be queried based on the street address of the most probable address to identify geolocation coordinates corresponding to that street address.

The technique 1100 includes comparing the address data converted at 1114 to another set of location data, such as based on a most probable current location of the wearable device from which the location data is received. At 1116, the data array determined at 1104 is classified, such as by performing a classification technique. Classifying the data array results in an identification of a most probable set of geolocation coordinates representative of a current location of the wearable device. At 1118, that most probable set of geolocation coordinates is determined based on the classification of the data array.

At 1120, a determination is made as to whether a proximity threshold is met based on the two sets of geolocation coordinates (e.g., processed at 1114 and 1118). If the proximity threshold is met, those sets of geolocation coordinates can be determined to be close enough in physical proximity to reflect them as corresponding to the same physical location (e.g., the same street address. This is because a most recently determined set of geolocation coordinates is determined to match the geolocation coordinates of the street address returned by the query at 1106. As such, at 1122, an address-based location is identified using the geolocation coordinates, and that address-based location is identified as an on-road location.

However, if the proximity threshold is not met, at 1124, address information is identified for the geolocation coordinates. The address information can include a street address nearest to the geolocation coordinates. At 1126, a direction relative to and distance from the identified address information is determined. The direction and distance may, for example, be calculated using map data, such as based on the geolocation coordinates determined for the wearable device and the geolocation coordinates corresponding to the nearest street address. At 1128, an address-based location is identified using the address information and the direction and distance, and that address-based location is identified as an off-road location.

At 1130, a message is generated. The message includes either the address-based information identified at 1122 or the address-based information identified at 1128 (e.g., one of an on-road location or an off-road location). For example, where the geolocation of the wearable device corresponds to an on-road location, a street address corresponding to the geolocation is indicated within the message. In another example, where the geolocation of the wearable device corresponds to an off-road location, one or more of a closest street address corresponding to that geolocation, a distance between that geolocation and that closest street address, or a direction of that geolocation relative to that closest street address is indicated within the message. The message can also include measurement data indicative of an event associated with the wearable device and/or a user thereof. For example, in addition to indicating the on-road location or the off-road location, the message can indicate one or more measurements taken by sensors or user inputs received by input elements of the wearable device. The measurements or user input can be used to identify a specific event that has occurred, such as based on an association between those measurements and events in a list of available events. After the message is generated, it can be transmitted to a recipient device.

The implementations of this disclosure can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus for generating and transmitting messages indicative of data measured using a wearable device, the apparatus comprising:

a memory; and a processor configured to execute instructions stored in the memory to:

receive measurement data and location data generated based on an event, the measurement data including sensor data representative of the event and an event time representing a time at which the sensor data was generated, the location data indicating a geolocation of the wearable device as of the event time;

receive historical data generated based on a previous event, the historical data including previous event data and previous location data, the previous event data indicating a previous event time at which previous sensor data representative of the previous event was generated, the previous location data indicating a previous geolocation of the wearable device as of the previous event time, wherein the previous event time is within a threshold period of time of the event time;

determine an address-based location of the wearable device representing a time-weighted geolocation of the wearable device as of a current time after the event time by projecting the location data according to the event time and the previous location data according to the previous event time, wherein the address-based location represents an off-road location reflecting a location that is a determined distance and a determined direction from a closest street address that corresponds to the location data;

generate a message based on the measurement data and the address-based location, the message indicating the time-weighted geolocation of the wearable device as of the current time; and transmit the message to a recipient device.

2. The apparatus of claim 1, wherein the measurement data and the location data are received from the wearable device.

3. The apparatus of claim 1, wherein the measurement data and the location data are received from a connected device configured to receive data from the wearable device.

4. The apparatus of claim 1, wherein the determined distance represents a distance between the geolocation of the wearable device as of the event time and the closest street address and the determined direction represents a direction of the geolocation of the wearable device as of the event time relative to the closest street address.

5. The apparatus of claim 1, wherein the instructions to generate the message based on the measurement data and the address-based location include instructions to:
indicate two or more of the closest street address, the determined distance, and the determined direction within the message.

6. The apparatus of claim 1, wherein the wearable device is a first wearable device and the recipient device is a second wearable device.

7. The apparatus of claim 1, wherein the message includes an identifier associated with the wearable device.

8. A method for generating and transmitting messages indicative of data measured using a wearable device, the method comprising:
receiving measurement data and location data generated based on an event, the measurement data including sensor data representative of the event and an event time representing a time at which the sensor data was generated, the location data indicating a geolocation of the wearable device as of the event time;
receiving historical data generated based on a previous event, the historical data including previous event data and previous location data, the previous event data indicating a previous event time at which previous sensor data representative of the previous event was generated, the previous location data indicating a previous geolocation of the wearable device as of the previous event time, wherein the previous event time is within a threshold period of time of the event time;
determining an address-based location of the wearable device representing a time-weighted geolocation of the wearable device as of a current time after the event time by projecting the location data corresponding to the vent time and the previous location data according to the previous event time, wherein the address-based location represents an off-road location that is a determined distance and a determined direction from a closest street address that corresponds to the location data;
generating a message using the measurement data and the address-based location, the message indicating time-weighted geolocation of the wearable device as of the current time; and
transmitting the message to a recipient device.

9. The method of claim 8, wherein the measurement data and the location data are received from the wearable device.

10. The method of claim 8, wherein the measurement data and the location data are received from a connected device configured to receive data from the wearable device.

11. The method of claim 8, wherein the determined distance represents a distance between the geolocation of the wearable device as of the event time and the closest street address and the determined direction represents a direction of the geolocation of the wearable device as of the event time relative to the closest street address.

12. The method of claim 8, wherein generating the message based on the measurement data and the address-based location comprises:
indicating two or more of the closest street address, the determined distance, and the determined direction within the message.

13. The method of claim 8, wherein the wearable device is a first wearable device and the recipient device is a second wearable device.

14. The method of claim 8, wherein the message includes an identifier associated with the wearable device.

15. A system comprising:
a wearable device configured to generate a notification and historical data, wherein the notification is based on a measurement determined at an event time using a sensor and based on a user input received using an input element, wherein the historical data is based on information determined at a previous event time using the sensor; and
a server device configured to generate a message based on the notification, wherein
the server device determines an address-based location of the wearable device representing a time-weighted geolocation of the wearable device as of a current time after the event time by projecting a first location of the wearable device as of the event time and a second location of the wearable device as of the previous event time, wherein the address-based location represents an off-road location that is a determined distance and a determined direction from a closest street address that corresponds to the location of the wearable device as of the event time,
the server device generates the message based on the notification and the address-based location such that the message indicates the time-weighted geolocation of the wearable device as of the current time, and
the server device transmits the message to a recipient device having permissions to receive the message.

16. The system of claim 15, wherein an input engine of the wearable device is used to determine an association between an event associated with one or more of the measurement or the user input and to generate the notification based on the association.

17. The system of claim 15, further comprising:
a connected device executing a companion application configured to:
receive the notification from the wearable device based on a beacon broadcasted from the wearable device;
embed geolocation coordinates representing the location of the wearable device as of the event time within the notification; and
transmit the notification embedded with the geolocation coordinates to the server device,
wherein the server device uses the notification embedded with the geolocation coordinates to generate the message.

18. The system of claim 15, wherein the determined distance represents a distance between the geolocation of the wearable device as of the event time and the closest street address and the determined direction represents a direction of the geolocation of the wearable device as of the event time relative to the closest street address.

19. The system of claim 15, wherein the server device generates the message by:
indicating two or more of the closest street address, the distance, and the direction within the message.

20. The system of claim 15, wherein the wearable device is a first wearable device and the recipient device is a second wearable device.

* * * * *